(12) United States Patent
Hoersten et al.

(10) Patent No.: US 10,951,401 B2
(45) Date of Patent: Mar. 16, 2021

(54) DIGITAL ASSET TRANSFER SYSTEM FOR SECURE DIGITAL ASSET TRANSACTIONS

(71) Applicant: Bitnomial, Inc., Chicago, IL (US)

(72) Inventors: Luke Hoersten, Chicago, IL (US); Michael Scott Dunn, Chicago, IL (US); Matthew Wraith, Chicago, IL (US)

(73) Assignee: BITNOMIAL, INC., Chicago, IL (US)

( * ) Notice: Subject to any disclaimer, the term of this patent is extended or adjusted under 35 U.S.C. 154(b) by 392 days.

(21) Appl. No.: 15/932,644

(22) Filed: Mar. 30, 2018

(65) Prior Publication Data

US 2019/0305943 A1    Oct. 3, 2019

(51) Int. Cl.
| | |
|---|---|
| *H04L 9/06* | (2006.01) |
| *H04L 9/08* | (2006.01) |
| *H04L 9/30* | (2006.01) |
| *H04L 9/14* | (2006.01) |

(52) U.S. Cl.
CPC .......... *H04L 9/0861* (2013.01); *H04L 9/0637* (2013.01); *H04L 9/0894* (2013.01); *H04L 9/14* (2013.01); *H04L 9/30* (2013.01)

(58) Field of Classification Search
CPC ... H04L 9/0861; H04L 9/0637; H04L 9/0894; H04L 9/14; H04L 9/30
See application file for complete search history.

(56) References Cited

U.S. PATENT DOCUMENTS

| | | | | |
|---|---|---|---|---|
| 2004/0190724 | A1* | 9/2004 | Dettinger | H04L 63/062 380/279 |
| 2017/0124647 | A1 | 5/2017 | Pierce et al. | |
| 2018/0183579 | A1* | 6/2018 | Roberts | G06Q 20/3552 |
| 2018/0189753 | A1* | 7/2018 | Konda | H04L 63/0272 |
| 2019/0272392 | A1* | 9/2019 | Falah | G06Q 10/10 |
| 2020/0177377 | A1* | 6/2020 | Smith | H04L 9/3271 |

OTHER PUBLICATIONS

NIST Special Publication 800-57 Part 1, Revision 4: Recommendation for Key Management, Part 1: General, Elaine Barker, Computer Security Division Information Technology Laboratory Jan. 2016, page 96. (Year: 2016).*
Andreas M. Antonopoulos, "Mastering Bitcoin: Programming the Open Blockchain," 2017 (2nd edition), O'Reilly Media, Inc., p. 73-75, 81-82, 95-96, 106-115, 149-151.
https://github.com/bitcoin/bips/blob/master/bip-0032.mediawiki (15 pages downloaded on Aug. 21, 2020).
https://github.com/bitcoin/bips/blob/master/bip-0044.mediawiki (6 pages downloaded on Aug. 21, 2020).

* cited by examiner

*Primary Examiner* — Paul E Callahan
(74) *Attorney, Agent, or Firm* — Mayer Brown LLP

(57) ABSTRACT

A system is disclosed for facilitating the secure transfer of digital assets that include making a first key and index scheme accessible for seamlessly and continuously executing digital asset transactions. The first key is capable of generating second keys and is made accessible to a sender of digital assets. The index scheme is customizable to meet the needs of the parties of the transaction and is capable of being used to generate a key derivation index. The first key and index scheme are secure, and for each digital asset transaction, the second key may be derived from the index scheme and first key, and the new key may be used to generate a new address.

18 Claims, 10 Drawing Sheets

DIGITAL ASSET TRANSFER SYSTEM FOR SECURE DIGITAL ASSET TRANSACTIONS

BACKGROUND OF THE INVENTION

1. Technical Field

This invention relates to the way digital assets are securely transferred. More particularly, the invention relates to a system for facilitating the secure exchange of digital assets between a sender and receiver whereby the sender and receiver may continuously and seamlessly transfer assets through use of a first key and an index scheme.

2. Related Art

In recent years, use of blockchain technology and digital transactions over peer-to-peer networks have become more popular in business and the world. Digital transactions in general provide a fast and secure method of buying, selling, transferring, and exchanging assets over a network by using methods based in cryptography, and without many of the inconveniences of conventional asset transfers. Digital transactions, such as the transfer of cryptocurrencies, however, present unique challenges as transactions can take place pseudonymously and often cannot be reversed. These challenges present problems with sending digital assets, including, for example, issues with the security of digital transactions, drawbacks to the openness of the transactions over the network, and consumption of computing power to store and process such transactions.

Digital transactions, including the exchange of cryptocurrency, like Bitcoin virtual currency, are vulnerable to malicious attack from outsiders, including viruses and malware. A form of malicious attack, known as a man-in-the-middle attack ("MITM" attack), occurs where an outsider intercepts, relays, or alters the transaction and communication between a sender and receiver who believe they are communicating securely with each other. The proof of ownership concept that many digital asset networks employ does not protect transactions where the MITM inserts itself unknowingly. The sender and receiver believe they are communicating, but unknowingly send information or assets to the wrong entity which may use proof of ownership to obtain the assets with little or no recourse for the sender or receiver. Examples of the MITM attack problem in the transfer of a digital asset, Bitcoin, are known in the art.

A related issue arising out of digital asset transactions is information leakage. Because digital transactions primarily operate using a public transaction ledger, also known as a blockchain, and a decentralized peer-to-peer network, information regarding each transaction is publicly available, including, for example, the public address or keys associated with the transaction. Accordingly, each time a user performs a digital transaction, more information may become available regarding that user and any related transaction. The leakage of this information exposes transaction strategies, and respective inventory, of users and provides additional vulnerabilities to attack from outsiders by increasing attack surface area. Examples of information leakage presented by the transfer of the digital asset Bitcoin are known in the art. Exchanging information related to each transaction over the peer-to-peer network also creates a significant amount of network communication, which not only increases vulnerabilities to attack but also consumes a significant amount of computing power and memory storage. Each transaction has specific addresses and other information associated with it that must be communicated, processed, or stored.

Therefore, there is a need in the art for improved systems for transferring digital assets while reducing network communication, computing power, and memory storage, and minimizing information leakage and risk of malicious attack from outsiders. The systems disclosed herein present a solution to this need, improve computer and user functionality, and provide other related advantages.

SUMMARY

According to some implementations of the disclosed systems that overcome problems and limitations of the prior art, a recipient in a digital transaction provides access to a first key and a key derivation index scheme for facilitating the secure transfer of digital assets. By providing access to the first key and the key derivation index scheme, two parties (e.g., a sender and a receiver of digital assets) may continuously and seamlessly perform digital transactions, while reducing network communications, vulnerability to MITM attack, and leakage of information.

According to some embodiments, the first key may be used, in connection with the key derivation index scheme that creates a key derivation index, to generate a plurality of second keys, including, for example, extended public keys, or child public keys, grandchild public keys, great-grandchild public keys, etc., as a tree extending from the first key. The first key and index scheme may be securely transferred, transmitted, sent, or otherwise made accessible to an entity such as a sender of digital assets for executing digital asset transactions. The sender may generate an address using the first key and the index scheme, which generates a key derivation index, to send the digital asset or assets to a recipient who may subsequently send or confirm receipt of the digital asset sent by the sender.

The disclosed systems provide a seamless environment for continuously executing digital transactions between two parties, entities, systems, etc. (e.g., a system or systems of the recipient and the sender of digital assets). Conventional digital asset transaction systems require the recipient of digital assets to repeatedly derive addresses for receiving digital assets from the same key and communicate each address to the sender. The disclosed systems improve upon prior art systems because, among other things, they do not require the recipient to use the same key to generate addresses or require the recipient to communicate each address to the sender. Permitting secure access to the first key and the index scheme therefore reduces network communication and data consumption present in prior art applications. The receiver and sender each have access to the first key and index scheme and so do not need to continuously communicate with each other regarding, for example, new addresses, keys, indexes, or transaction details.

In addition to reducing the amount of communication and data exchanged between the sender and receiver, the transactions are less susceptible to MITM attack, and transactions between two parties, entities, systems, etc., do not leak information, because the sender and receiver may use the first key and the index scheme unknown to outsiders to generate unique and secure identifiers for each transaction. Because each transaction relates to a different key, index path, and address, and the index scheme and the first key are made securely accessible, each address used for a digital transaction which may be recorded, for example, on a blockchain is different and derived from a different key (which is derived from the first key and the index scheme).

In implementing the disclosed systems, information concerning the identity and volume of digital assets using an address related to a key is not leaked, exposed to outsiders, or compromised in the same manner in which information is when using conventional digital asset transfer systems. The disclosed systems also achieve other benefits over conventional systems, such as increased flexibility with organizational structure of transactions between parties from use of the index scheme which a party or the parties to a digital asset transaction may customize to fit their relationship, transactions, or database management systems.

In certain embodiments, the disclosed systems may be implemented on display devices to create improved display interfaces that allow users (e.g., a recipient of digital assets) to more seamlessly, quickly, and efficiently perform and review digital asset transaction data and more quickly access desired digital transaction data stored in an application or program on a computing device, such as a smart phone, personal computer, electronic tablet, smart watches, or other display-equipped devices.

In certain embodiments, the disclosed systems can be partially or wholly implemented on a "computer-readable medium" or "machine accessible medium having instructions encoded thereon," for example, by storing computer-executable instructions or modules, or by utilizing computer-readable data structures. Of course, the systems of the above-referenced embodiments may also include other additional elements, steps, computer-executable instructions, or computer-readable data structures. In this regard, other embodiments are disclosed and claimed herein as well.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following figures and description. The components in the figures are not necessarily to scale, emphasis instead being placed upon illustrating the principles of the invention.

DETAILED DESCRIPTION OF THE PREFERRED EMBODIMENTS

Aspects of the disclosed systems may be implemented with computer devices, distributed computing devices, memory storage devices, and computer networks that allow users to perform calculations as well as process, store, and exchange information.

The disclosed systems may be realized utilizing an example of digital asset transfer for the secure transfer of Bitcoin during settlement of futures contracts. However, other networks or forms of digital assets, including cryptocurrencies other than Bitcoin, may implement or use the disclosed systems for the secure transfer of the digital assets. The following descriptions of implemented embodiments, therefore, will be best understood by those familiar with the digital asset transfer of Bitcoin, but those skilled in the art will understand from the functional description which follows that the disclosed systems could be implemented for transfer of other digital assets in digital format with a right to use, such as digital documents, legal contracts, bank transactions, movies, music, or cryptocurrencies such as Ethereum, Litecoin, XRP, etc.

Figure 1:
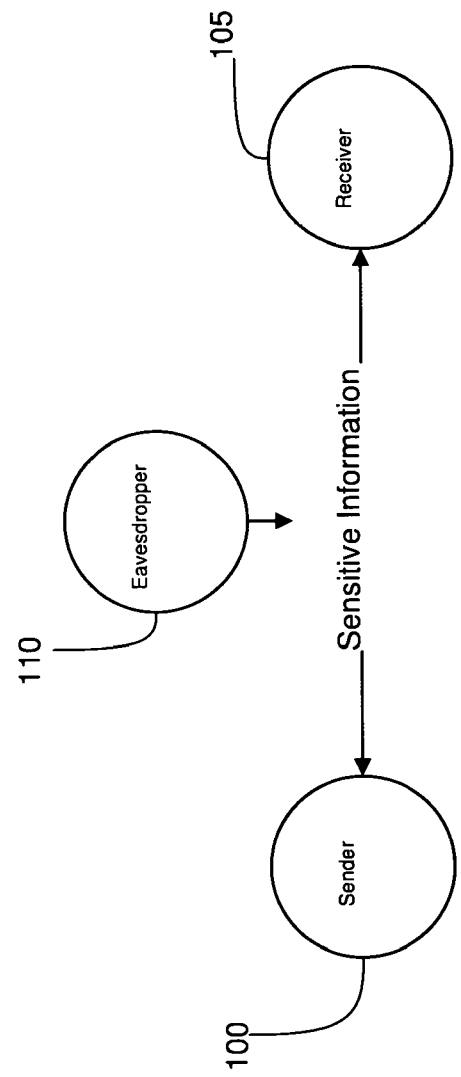
FIG. 1 illustrates a simplified diagram of the MITM attack interception of digital assets.

An overview and example of the man-in-the-middle problem is shown in FIG. 1. A sender of digital assets 100 and receiver of digital assets 105 may believe to be sharing sensitive information, such as digital asset addresses or public keys, and transferring digital assets between each other. In one example of a MITM attack, an eavesdropper 110 may insert a virus that may infect a hardware device of the sender 100 that generates addresses for the transfer of digital assets. When the sender 100 goes to send or transfer the digital assets to the receiver 105, the eavesdropper 110 via a virus alters the address so that the sender 100 sends digital assets to someone or thing other than the intended receiver 105. Attempts to alleviate the risk of MITM attack known in the art include requiring the sender 100 to validate the receiver address prior to every transaction, but the added verification step decreases a user's or computer's ability to repeatedly, continuously, seamlessly, or quickly send digital assets, creates additional network communication, and consumes additional computing power and memory.

Figure 2:
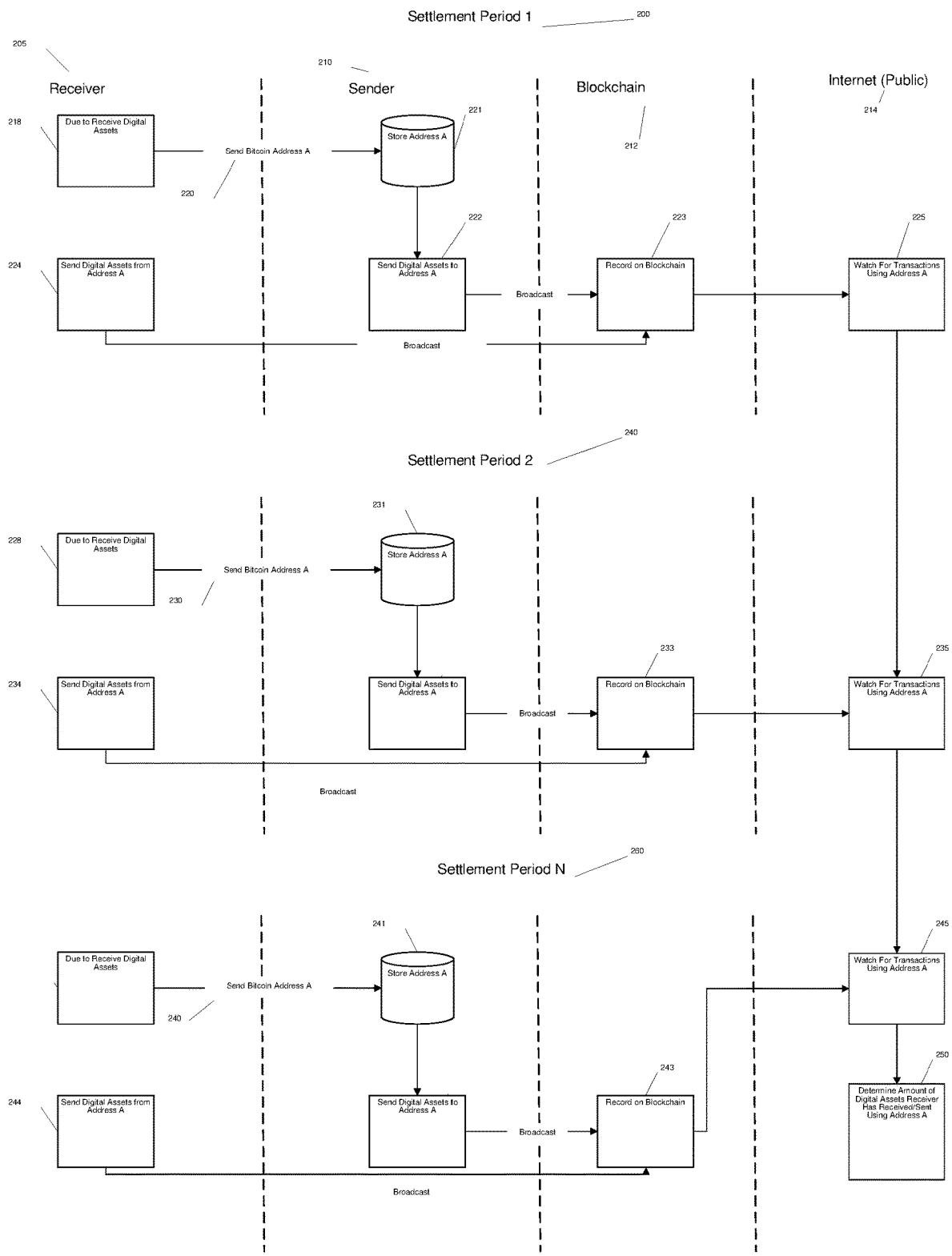
FIG. 2 illustrates leakage of information during transactions of Bitcoin over the Bitcoin network and blockchain.

Referring now generally to FIG. 2, an illustration of the information leakage problem presented in prior art applications in the transfer of the digital asset Bitcoin is shown. During Settlement Period 1, (200), a receiver of digital assets 205 is due to receive digital assets 218 and sends an address, Address A 220, to a sender of digital assets 210. A blockchain 212 for recording transaction is accessible to the Internet (Public) 214. The sender of digital assets 210 stores the address 221 and sends the digital assets to Address A 222, which in turn creates, via a broadcast, a record on blockchain 223. The receiver 205 sends the digital assets using a private key associated with Address A 224, which in turn also creates, via a broadcast, a record on blockchain 223. The Internet (Public) 214 is able to view and monitor 225 the blockchain 212 for any transactions involving Address A during Settlement Period 1 (200).

During Settlement Period 2, (240), the receiver of digital assets 205 is due to receive digital assets 228 and sends the address, Address A 230, to a sender of digital assets 210. The sender of digital assets 210 may be the same sender of digital assets as during settlement period 1 (200), or a different sender of digital assets. Regardless, the sender of digital assets 210 stores the address 231 and sends the digital assets to Address A, which in turn creates, via a broadcast, a record on blockchain 233. The receiver 205 sends the digital assets using the private key associated with Address A, 234, which in turn creates, via a broadcast, a record on blockchain 233. The Internet (Public) 214 is able to view and monitor 235 the blockchain 212 for any transactions involving Address A during Settlement Period 2 (240).

As illustrated by Settlement Period N (260), the Settlement Period may be repeated, an nth number of times. For each settlement period, the receiver of digital assets 205 sends the address, Address A 240, to a sender of digital assets 210. The sender of digital assets 210 may be the same sender of digital assets as during a previous settlement period, or a different sender of digital assets. Regardless, the sender of digital assets 210 stores the address 241 and sends the digital assets to Address A, which in turn creates, via a broadcast, a record on blockchain 243. The receiver 205 sends the digital assets using the private key associated with Address A, 244, which in turn creates, via a broadcast, a record on blockchain 243. The Internet (Public) 214 is able to view and monitor 245 the blockchain 212 for any transactions involving Address A during each settlement period. The blockchain may be publicly watched, reviewed, and monitored to determine the amount of digital assets the receiver has received/sent using Address A 250, thus compromising information concerning the identity and volume of digital assets relating to Address A.

Figure 3:
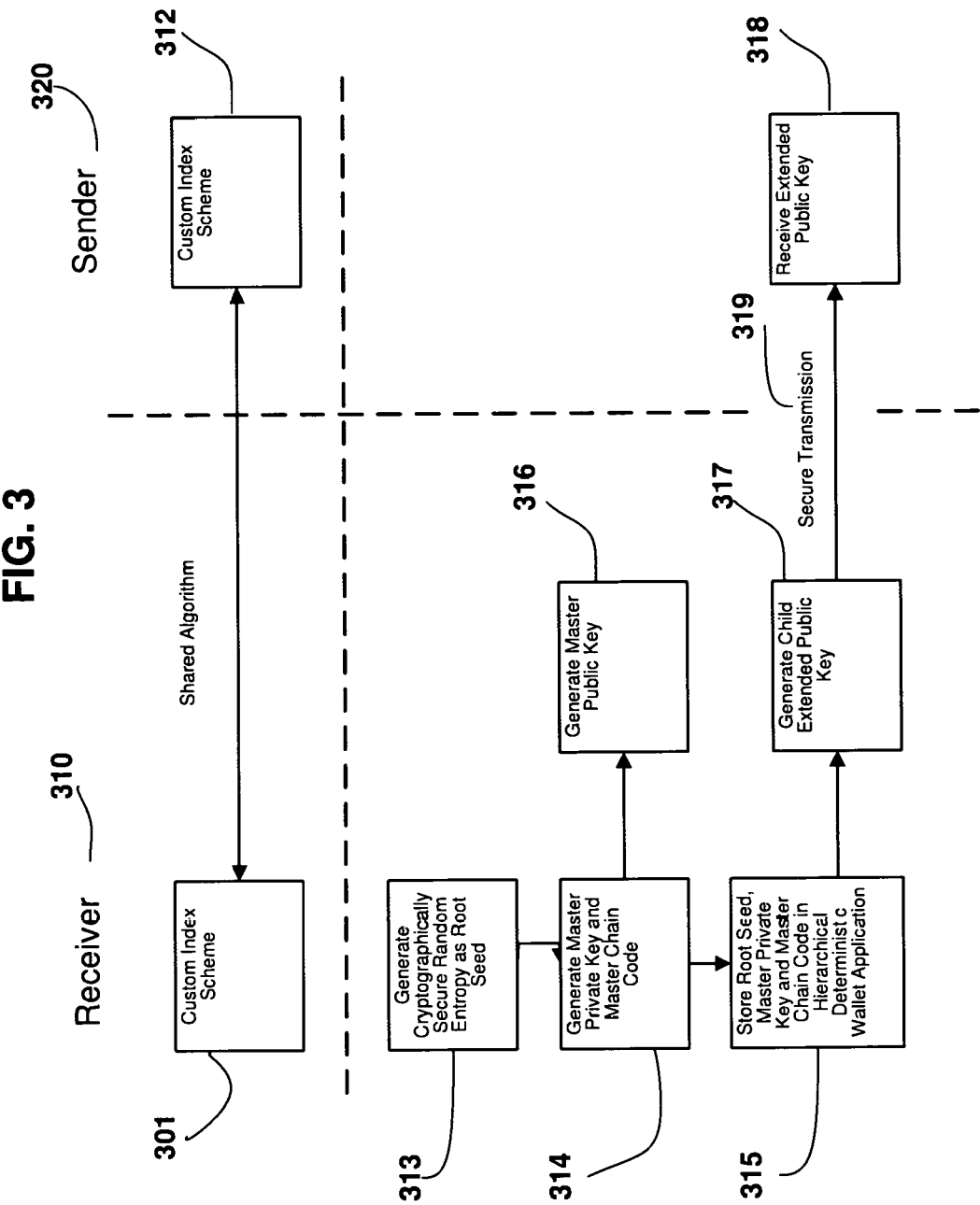
FIG. 3 illustrates an initial setup that may be used by a sender and receiver of digital assets to transfer digital assets.

Referring generally to FIG. 3, an example of the initial setup of a computer implemented system that may implement the method is shown. During an implementation for the initial setup, a receiver of digital assets 310 and sender of digital assets 320 share an index scheme (301 and 312). The index scheme (301 and 312) may be used to encode information into a key derivation index using, for example, a web application on a computing device. The sender 320 or receiver 310 may customize the index scheme (301 and 312) to fit their relationship, transaction preferences, database systems, etc. The index scheme (301 and 312) may be sent, stored, transmitted, transferred, or otherwise made accessible to the receiver 310 or sender 320 such that the sender 320 and receiver 310 have access to the index scheme (301 and 312). The receiver 310 generates cryptographically secure random entropy in memory or a cryptographically secure random number as a root seed using a processor or other known means (e.g., a hardware random number generator) for generating the root seed 313. The root seed may be input into a one-way hash function that generates and outputs a master private key and a master chain code 314. The root seed, master private key, and master chain code may be stored in memory 315 (e.g., in memory accessible by a hierarchical deterministic ("HD") wallet application or other program or application). The master private key may be input into a function, for example, using a processor running an elliptic curve multiplication process or other cryptographically secure process known in the art, that generates a corresponding master public key 316. The master public key and the master chain code may be inputs to a function, for example, using a processor running an elliptic curve multiplication process or other cryptographically secure process known in the art, that generates a child extended public key that is capable of generating other keys such as child public keys, grandchild public keys, great-grandchild public keys, etc., 317. In the initial setup shown in FIG. 3, the receiver 310 transfers the child extended public key via secure transmission 319 for the sender 320 to receive the child extended public key 318. The child extended public key may be sent, stored, transmitted, transferred, or otherwise made accessible to the receiver 310 and/or sender 320 such that the sender 320 and receiver 310 have access to the child extended public key or a copy or copies of the child extended public key. The index scheme the receiver has access to 301 and the index scheme the sender has access to 312, which may be the same or modified to fit the relationship of the sender 320 and receiver 310, is capable of being used to encode index information into the key derivation index. The index scheme and child extended public key may be stored on an electronic storage device, such as a harddrive or server, separately or together.

Figure 4:
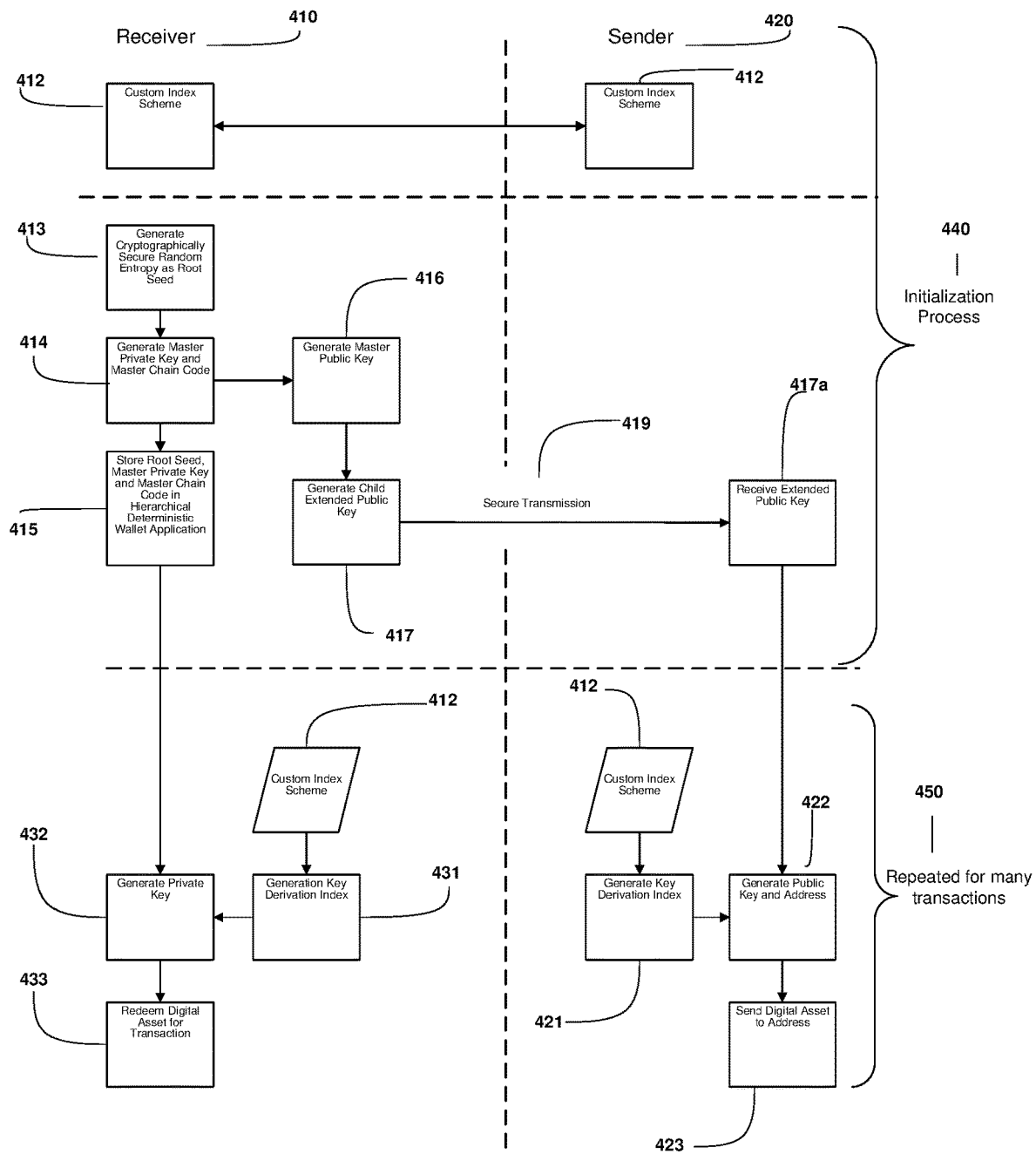
FIG. 4 illustrates a computer implemented method that may be implemented by a computer system of a sender and receiver of digital assets to transfer the digital assets.

Another disclosed system is shown in FIG. 4. Referring now to FIG. 4, which incorporates the initial setup shown in FIG. 3, a receiver of digital assets 410 and sender of digital assets 420 share an index scheme 412. The index scheme 412 may be used to encode information into a key derivation index using, for example, a web application on a computing device. The sender 420 or receiver 410 may customize the index scheme 412 to fit their relationship, transaction preferences, database systems, etc. The index scheme 412 may be sent, stored, transmitted, transferred, or otherwise made accessible to the receiver 410 or sender 420 such that the sender 420 and receiver 410 have access to the index scheme 412. The receiver 410 generates cryptographically secure random entropy in memory or a cryptographically secure random number as a root seed using a processor or other known means (e.g., a hardware random number generator) for generating the root seed 413. The root seed may be input into a one-way hash function that generates and outputs a master private key and a master chain code 414. The root seed, master private key, and master chain code may be stored in memory 415 (e.g., in memory accessible by a hierarchical deterministic ("HD") wallet application or other program or application). The master private key may be input into a function, for example, using a processor running an elliptic curve multiplication process or other cryptographically secure process known in the art, that generates a corresponding master public key 416. The master public key and the master chain code may be inputs to a function, for example, using a processor running an elliptic curve multiplication process or other cryptographically secure process known in the art, that generates a child extended public key that is capable of generating other keys such as child public keys, grandchild public keys, great-grandchild public keys, etc., 417. The receiver 410 transfers the child extended public key via secure transmission 419 for the sender 420 to receive the child extended public key 417a. The child extended public key may be sent, stored, transmitted, transferred, or otherwise made accessible to the receiver 410 and/or sender 420 such that the sender 420 and receiver 410 have access to the child extended public key or a copy or copies of the child extended public key. The index scheme 412 and child extended public key may be stored on an electronic storage device, such as a hard-drive or server, separately or together.

By implementing the initialization process (440), the receiver 410 and sender 420 have access to the index scheme 412 (e.g., a customized index scheme agreed upon by the sender and receiver) and the child extended public key or copies thereof. The sender 420 uses the index scheme 412, which comprises an index derivation function, to generate the key derivation index 421. The index scheme 412 and the child extended public key made accessible to the receiver 410 and sender 420 are inputs by the sender 420 into a function by which using a processor generates a public key 422. At this step, an address may also be derived from the public key through use of a cryptographic hash function 422. This address is used by the sender 420 to send or transfer the digital assets 423. The receiver 410 uses the index scheme 412 to generate the key derivation index 431. The key derivation index and the extended private key are inputs by the receiver to a function that generate the private key 432. The private key generated corresponds to the public key generated by the sender 420. The private key may be used by the receiver 410 to subsequently send or confirm receipt of the digital assets sent by the sender 433. The sender 420 and receiver 410 may seamlessly perform repeated transactions using the index scheme 412 and child extended public key (450), wherein each transaction corresponds to a different public key, different address, and different key derivation path index. One skilled in the art will appreciate the seamlessness, flexibility, and scalable organizational structure that results from implementing the disclosed systems.

In some embodiments, the sender and receiver may agree on the type of transaction details or metadata to encode into the key derivation path index such as data representing the account identification, product identification, and settlement date of a transaction, for purposes of creating a custom index scheme specific to settlement of derivatives transactions or contracts so that each contract or transaction may correspond to the agreed upon transaction metadata encoded into the key derivation index. As an example, the sender and receiver may follow the Bitcoin Improvement Proposal 44[1] for determining which index to use, and follow Bitcoin Improvement Proposal 32's index notation[0] to send and receive Bitcoin at the address associated with the key indexed by: M/account/product/settlement date (e.g., index derivation function(extended key=M, account id=0, product id=1, settlement date=20180323): M/0/1/2147483647; or index derivation function(extended key=M, account id=4, product id=2, settlement date=20180622): M/4/2/3423490239)). By implementing this disclosed method, the extended public key and transaction data are only made accessible to the sender and receiver, not the public, and the sender and receiver reduce network communication, increase security by reducing attack surface area, and increase accounting transparency by encoding transaction history in the keys. The sender may repeatedly and seamlessly generate public keys and addresses derived from the extended public key made accessible to the sender and receiver for securely, seamlessly, and repeatedly transferring digital assets to the receiver.

The method shown in FIG. 4 may be implemented by computer-executable instructions stored on a "computer-readable medium" or "machine accessible medium having instructions encoded thereon." For example, in systems that implement the disclosed methods, a computer device may store the root seed, master private key, master chain code, index scheme, master public key, or child extended public key, and include computer-executable instructions for generating the index scheme and key derivation index, generating the child extended public key, transmitting or otherwise making accessible the first key (e.g., an extended public key or child extended key), and receiving the digital asset. The method shown in FIG. 4. may also be implemented over a peer-to-peer network or incorporate the use of a blockchain or other digital ledger for recording the digital transactions.

Of course, numerous additional computer devices, such as servers, cloud computing centers, personal computers, handheld devices, personal digital assistants, and other devices may also be used to store data, process information, and implement the disclosed systems. One skilled in the art will appreciate that the initial setup in FIG. 3 and method in FIG. 4 are merely examples, and the method shown in FIG. 4 may be implemented using different types of communications and devices as part of a system.

Figure 5A:
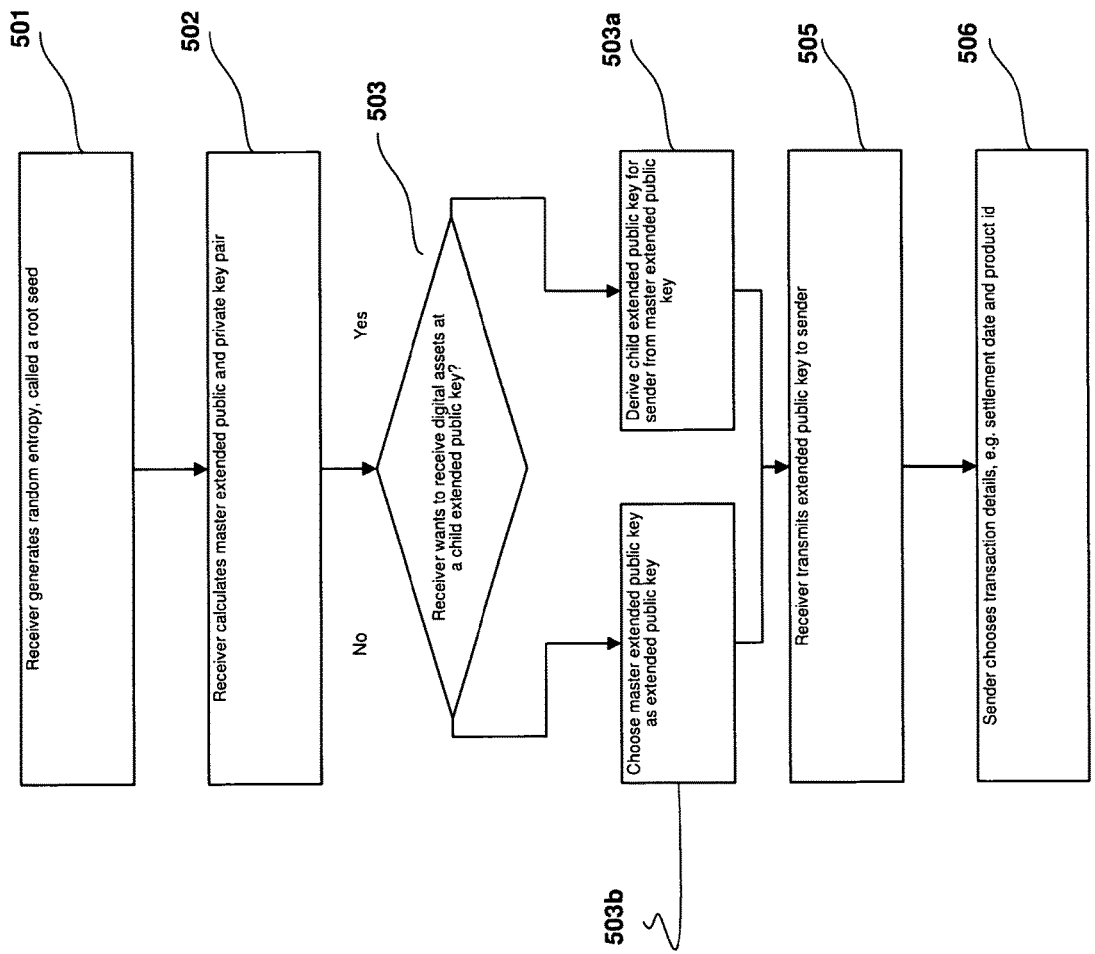
FIGS. 5a and 5b illustrates a flowchart of a computer implemented method that may be implemented by a system of a sender and receiver of digital assets to transfer the digital assets.

Referring now to FIG. 5a, a flowchart illustrates an embodiment of a computer implemented method that may be implemented by a computer system of a sender and receiver of digital assets to transfer the digital assets. For example, the steps illustrated in the flow chart may be general steps taken by a sender or receiver of digital assets using a computer application (e.g., a type of deterministic wallet application programmed to implement embodiments of the disclosed system) or other application or program run on sender or receiver computer devices to transfer digital assets in accordance with the disclosed systems. In step 501, a receiver using a computer device generates random entropy or a random number as a root seed, and then in step 502 generates or calculates a master extended private key and extended public key as a pair. At step 502, the receiver's device may store the master extended public key and master private key as a pair in memory and store the root seed in memory. In step 503, the receiver determines whether to receive digital assets at a child extended public key. If yes, 503a, the receiver's device generates a child extended public key from the master extended public key. The child extended public key is capable of being used to generate a plurality of keys and is the key made accessible to the sender. If no, 503b, the receiver uses the master extended public key, which is capable of being used to generate a plurality of keys, and the master extended public key may be made accessible to the sender.

In step 505, the receiver transmits or otherwise makes accessible either the master extended public key or the child extended public key (both of which are capable of being used to generate a plurality of keys) to the sender, depending on the decision at step 503. This step 505 may include implementation of a serialization procedure to extract and obtain a copy of the extended public key (e.g., Bitcoin Improvement Proposal 32 provides a serialization procedure for extended public keys used in Bitcoin transactions) and may include a computer implemented process for the transmission of the key to the sender. For example, a receiver's device running an HD wallet application or other application on a computer device may link to a text or email application to securely transmit the extended public key to the sender. Of course, other ways for securely making accessible the key to the sender or sending the key to the sender include others forms of communication, such as in-person communication, telephone, SMS, facsimile, wireless communication, or other secure data transmittal or equivalent thereof. In step 506, the sender receives the extended public key and selects or chooses transaction details, such as the settlement date and product identification, as parameters for the purpose of creating an index scheme. At this step, 506, the sender may use a device running an application (e.g., a type of deterministic wallet application programmed to implement the disclosed system) or other application or program to receive and store the extended public key. This step, 506, may occur before or after the receiver makes the extended public key accessible to the sender, and the sender or receiver may select or agree to certain transaction details as parameters for the purpose of customizing the index scheme.

Figure 5B:
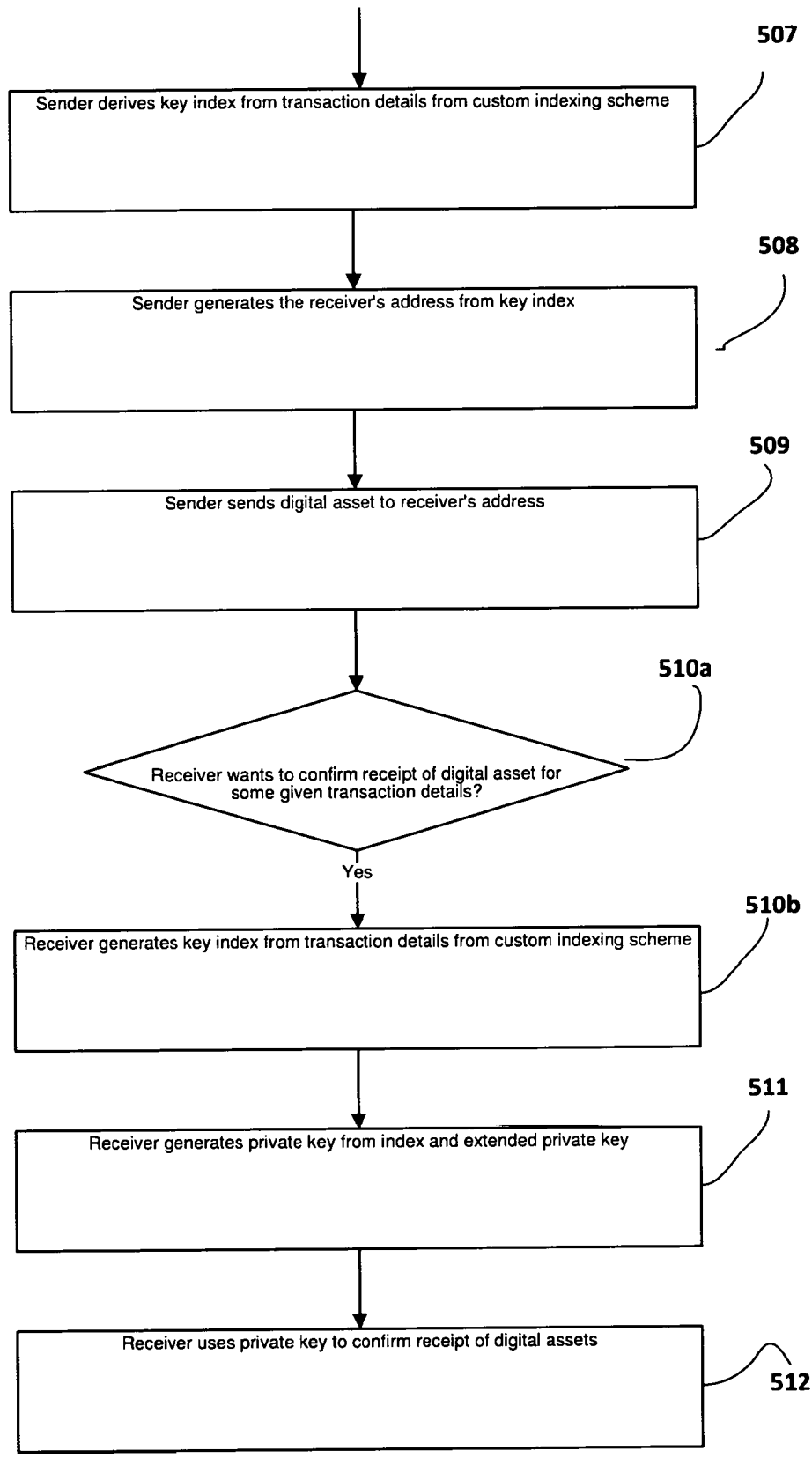

Referring now to FIG. 5b, which is a continuation of the flowchart in FIG. 5a, in step 507, the sender generates a key index that is derived from the transaction details and index scheme. At this step, the sender and receiver may verify the key index. In step 508, the sender generates an address based on the key index and a public key derived from the extended public key. This address is the receiver's address that the sender may send or transfer the digital assets to, step 509. At step 509, the receiver seeks to confirm receipt of the digital assets for a given transaction. At this step, the receiver may be continually or automatically scanning to confirm receipt of the digital assets for a given transaction, or the receiver may have the option for a manual action to confirm receipt of the digital assets for a given transaction.

When the receiver seeks to confirm receipt of the digital assets for some given transaction details 510a, the receiver generates a key index that is derived from the transaction details and index scheme at step 510b. At step 511, the receiver generates a private key from the key index and an extended private key that corresponds to the extended public key made accessible to the sender. At step 512, the receiver uses the private key to confirm receipt of the digital assets. One skilled in the art will appreciate that the flowchart in FIG. 5 is merely an example and may be sequenced differently or include additional or fewer steps to implement the embodiments of the disclosed systems.

The methods shown in FIGS. 4, 5a, and 5b and initial setup shown in FIG. 3 involve a single sender and single receiver of digital assets. Other embodiments may include a single sender and multiple receivers, or multiple senders and a single receiver, or multiple senders and multiple receivers, or an intermediary or intermediaries between senders or receivers. When multiple senders, intermediaries, or receivers are involved, the index scheme and extended public key made accessible to the sender and receiver may be agreed upon or modified so that only certain index data may be generated by specific senders or receivers, and only specific public keys may be generated by specific senders.

Figure 6:
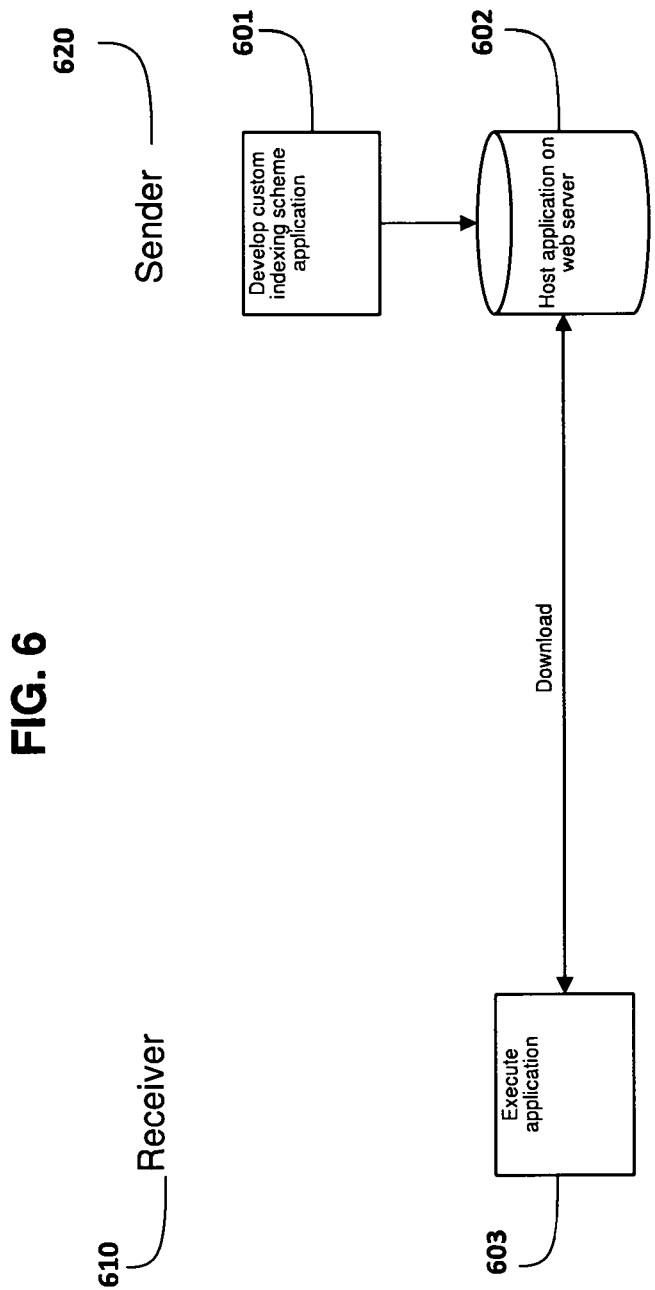
FIG. 6 illustrates a computer implemented method that may be implemented by a system of a sender and receiver of digital assets to transfer the digital assets where the recipient of digital assets performs the method using an application or program downloaded from a sender of digital assets.

In FIG. 6, the sender of digital assets 620 may develop an application that includes an index scheme 601 and make the application accessible to a receiver 610 or receivers of digital assets via hosting the application on a webserver 602. The sender 620 may customize the application and index scheme to include transaction details or metadata such as the account identification, product identification, or settlement date. The receiver of digital assets 610 may download the application via a network connection and execute the application 603. By executing the application, the receive may implement the initial set up illustrated in FIG. 3, and perform transactions as illustrated in FIG. 4. For example, the receiver may use the application during the settlement process of futures contracts to generate the key derivation index and private key associated with settlement and to confirm receipt of a digital asset for the settlement transaction.

Figure 7:
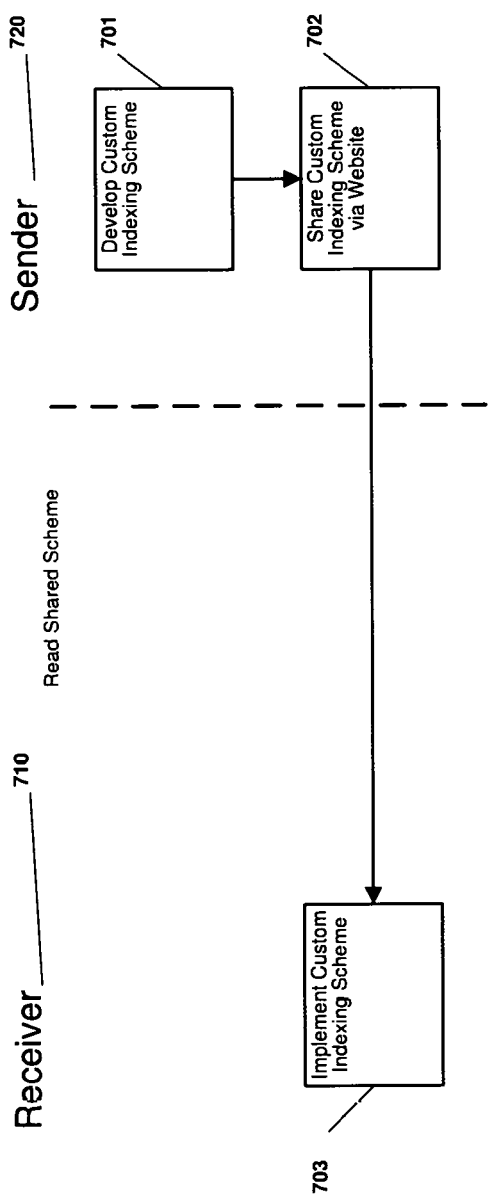
FIG. 7 illustrates a computer implemented method that may be implemented by a computer system of a sender and receiver of digital assets to transfer the digital assets where the sender of digital assets shares the index scheme via a website.

Referring to FIG. 7, the sender of digital assets 720 may develop an index scheme 701 and make the index scheme accessible to the receiver of digital assets 710 via a secure website 702. The receiver 710 may download and implement the index scheme 703. Using the implemented index scheme, the receiver 710 may perform transactions as illustrated in FIG. 4. For example, the receiver may use the index scheme during the settlement process of futures contracts to generate the key derivation index and private key associated with settlement and to confirm receipt of a digital asset for the settlement transaction.

Figure 8:
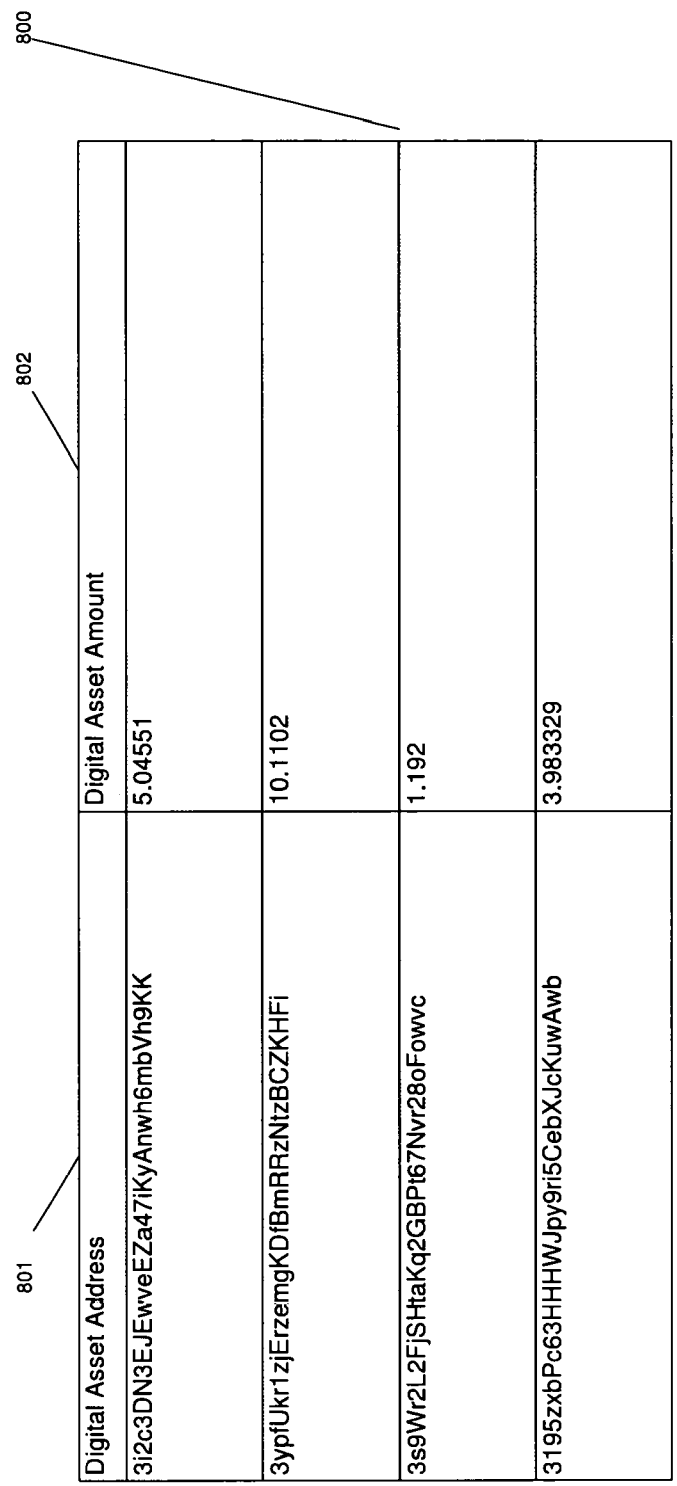
FIG. 8 illustrates a display screen of a computing device where a user of the electronic device may more quickly access a summary or limited set of digital asset transaction data.
Figure 9:
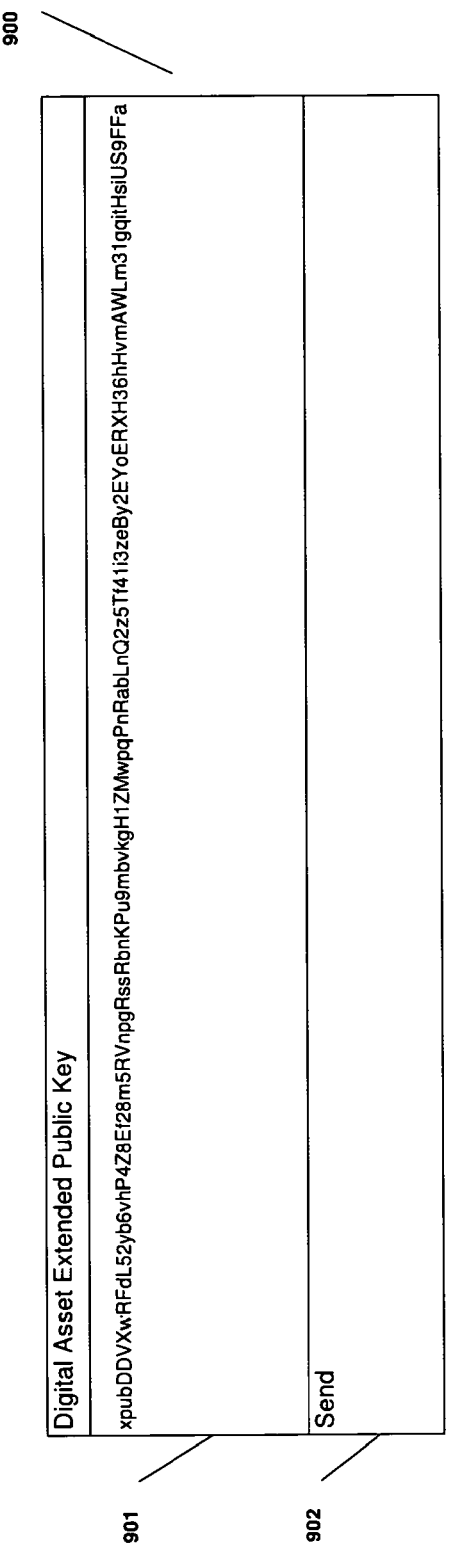
FIG. 9 illustrates a display screen of an electronic device where a user may securely make accessible or send the first key such as an extended public key.

As shown in FIGS. 8 and 9, a computing device may be used to implement the disclosed systems and include a display screen (800 in FIG. 8 and 900 in FIG. 9, respectively), including, for example, a graphical user interface ("GUI"), which displays a specific set of information to the sender or receiver, including the custom index scheme or the extended public key made accessible to the sender and receiver. In addition to the display screen (800 in FIG. 8 and 900 in FIG. 9, respectively), the computing devices may comprise one or more processors, memory registers, network interface controllers, and an application (e.g., a deterministic wallet application) and transmission component (e.g., email, text, or other application or way for transmitting or communicating information that is coextensive with the processor) for communicating the extended public key. The display screen (800 in FIG. 8 and 900 in FIG. 9, respectively) may display a digital asset transaction summary, which may summarize or list a limited set of data corresponding to each digital asset received, the sender, or the key made accessible to the sender and receiver. In response to a user selection of particular data on the display screen, the computing device with the display screen may display particular digital asset transaction data including the key derivation index. The computing device with display screen running the application may be used to seamlessly and continuously perform digital assets transactions, implement trading strategies, transmit the extended public key or other information to an intermediary, sender, or senders of digital assets, verify addresses, or send, or confirm receipt of digital assets.

The display screen may improve the efficiency of a user of the computing device and the application that, when executed, implements parts of the disclosed systems to perform repeated transactions by aggregating and summarizing specific transaction metadata and details corresponding to specific senders of digital assets. For example, as shown in FIG. 8, the display screen 800 may display digital asset addresses 801 and the associated digital asset amount 802 in the receipt confirmation process, or as shown in FIG. 9, the display screen 900 may display the extended public key 901 and display "send" 902 to provide the user (e.g., the sender or receiver) with the option for sending or otherwise making the extended public key 901 available to another party.

The disclosed systems may include one or more processors, memory registers, network interface controllers, hardware random number generators, network connections, transmission components, computer programs or applications, display screens such as a graphical user interface, or computing devices to implement the disclosed systems. The disclosed systems may include communication over a peer-to-peer network or use of a blockchain or other digital ledger for recording digital transaction. A "computer-readable medium" or "machine accessible medium having instructions encoded thereon" may comprise any medium that contains, stores, communicates, propagates, or transports software for use by or in connection with an instruction executable system, apparatus, or device. The medium may selectively be, but not limited to, an electronic, magnetic, optical, electromagnetic, infrared, or semiconductor system, apparatus, device, or propagation medium. A non-exhaustive list of examples of a machine-readable medium or a machine accessible medium having instructions encoded thereon would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium or machine accessible medium having instructions encoded thereon may also include a tangible medium upon which software is printed, as the software may be electronically stored as an image or in another format (e.g., through an optical scan), then compiled, and/or interpreted or otherwise processed. The processed medium may then be stored in a computer, computing device, and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for facilitating the secure transfer of digital assets, the method comprising:
   deriving a first key,
      wherein a plurality of second keys are capable of being derived from the first key;
   extracting, via a serialization procedure, the first key;
   generating a key derivation index from an index scheme;
   making the first key accessible for purposes of executing a digital asset transaction corresponding to the first key and the key derivation index;
   scanning a peer-to-peer network for receiving digital assets corresponding to one of the plurality of second keys;
   receiving at least one digital asset,
      wherein each digital asset received corresponds to the first key and the key derivation index.

2. The computer-implemented method of claim 1, wherein the first key is a master extended public key derived from a master private key.

3. The computer-implemented method of claim 1, wherein the first key is a child extended public key derived from a master public key.

4. The computer-implemented method of claim 1, wherein the key derivation index comprises one or more of the following identifiers: an account identifier, a product identifier, and a settlement identifier.

5. The computer-implemented method of claim 1, further comprising:
   generating a master private key and a master chain code, wherein the first key is derived from the master private key and the master chain code;
   generating a first private key, wherein the first private key is derived from the master private key, the master chain code, and the key derivation index;
   using the first private key at the step of receiving at least one digital asset to confirm receipt of each of the digital assets.

6. The computer-implemented method of claim 1, wherein each digital asset received corresponds to a private key derived from the key derivation index.

7. The computer-implemented method of claim 1, furthering comprising: storing the first key and the key derivation index.

8. The computer-implemented method of claim 1, wherein the first key is made accessible to a sender of digital assets via a secure electronic communication.

9. The computer-implemented method of claim 1, wherein the steps are performed by executing an application received from a sender of digital assets.

10. The computer-implemented method of claim 1, further comprising receiving the index scheme from a sender of digital assets.

11. The computer-implemented method of claim 1, further comprising displaying via a display screen a digital asset transaction summary, wherein the digital asset transaction summary displays a limited list of data corresponding to the first key and each digital asset received, and in response to a user selection of particular data, displaying particular digital asset transaction data including the key derivation index.

12. A system for the secure transfer of digital assets, comprising a computing device comprising a display screen and a machine accessible medium having instructions encoded thereon for enabling a processor to perform the operation of:
   generating a first key,
      wherein a plurality of second keys are capable of being derived from the first key;
   generating a key derivation index from an index scheme;
   making the first key accessible for executing a digital asset transaction corresponding to the first key and the key derivation index;
   receiving at least one digital asset,
      wherein each digital asset received corresponds to the first key and the key derivation index;
      wherein the machine accessible medium having instructions encoded thereon is part of a computer application stored on the computing device, the computing device configured to display on the display screen a digital asset transaction summary;
      wherein the digital asset transaction summary displays a limited list of data corresponding to each digital asset received, each of the data in the list being selectable to confirm the receipt of digital assets.

13. The system of claim 12, further comprising a network interface controller connected to the processor, wherein the processor in connection with the network interface controller performs the operation of scanning a peer-to-peer network for receiving digital assets corresponding to one of the plurality of second keys.

14. The system of claim 12, wherein the computer application is a deterministic wallet application.

15. The system of claim 12, further comprising a transmission component to send the first key made accessible to a sender of digital assets.

16. A computer implemented method for facilitating the secure transfer of digital assets, the method comprising:
   receiving an index scheme;
   generating a root seed;
   inputting the root seed into a one-way hash function to create a master private key and a master chain code;
   storing the root seed, the master private key, and the master chain code;
   generating a master public key from the master private key;
   combining the master public key with the master chain code to generate an extended child public key,
      wherein the child extended public key is capable of generating a plurality of public keys;
   making the child extended public key accessible to a sender of digital assets;
   generating a key derivation index from the index scheme;
   generating a private key from the key derivation index and the master private key;
   using the private key to receive digital assets, wherein each digital asset received corresponds to the child extended key and the key derivation index.

17. The computer implemented method of claim 16, wherein the index scheme is configured for use in a settlement transaction of contracts, and wherein the received digital assets correspond to the settlement transaction.

18. A system for the secure transfer of digital assets, comprising a computing device comprising a display screen and a machine accessible medium having instructions encoded thereon for enabling a processor to perform the operation of:

receiving an index scheme;

generating a root seed;

inputting the root seed into a one-way hash function to create a master private key and a master chain code;

storing the root seed, the master private key, and the master chain code;

generating a master public key from the master private key;

combining the master public key with the master chain code to generate an extended child public key, wherein the child extended public key is capable of generating a plurality of public keys;

making the child extended public key accessible to a sender of digital assets;

generating a key derivation index from the index scheme;

generating a private key from the key derivation index and the master private key;

using the private key to receive digital assets, wherein each digital asset received corresponds to the child extended key and the key derivation index;

wherein the machine accessible medium having instructions encoded thereon is part of a computer application stored on the computing device, the computing device configured to display on the display screen a digital asset transaction summary.

* * * * *